(12) United States Patent
Dersch et al.

(10) Patent No.: US 6,492,451 B1
(45) Date of Patent: Dec. 10, 2002

(54) PIGMENTED FORMULATIONS BASED ON AQUEOUS POLYMER DISPERSIONS

(75) Inventors: Rolf Dersch, Neustadt (DE); Joachim Roser, Mannheim (DE); Bernhard Schlarb, Ludwigshafen (DE); Cheng-Le Zhao, Schwetzingen (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 09/554,073

(22) PCT Filed: Nov. 13, 1998

(86) PCT No.: PCT/EP98/07284
§ 371 (c)(1),
(2), (4) Date: May 11, 2000

(87) PCT Pub. No.: WO99/25780
PCT Pub. Date: May 27, 1999

(30) Foreign Application Priority Data

Nov. 14, 1997 (DE) .......................................... 197 50 618

(51) Int. Cl.$^7$ ................................................ C08K 3/18
(52) U.S. Cl. ........................ 524/430; 524/502; 524/507; 524/510; 524/519; 524/521; 524/523
(58) Field of Search ................................ 524/430, 502, 524/507, 510, 519, 521, 523

(56) References Cited

U.S. PATENT DOCUMENTS 4,724,244 A * 2/1988 Kempter et al. ............ 523/414
5,145,902 A * 9/1992 Ravet et al. ................. 524/425
5,147,506 A * 9/1992 Mongoin et al. ........... 162/135

* cited by examiner

Primary Examiner—Edward J. Cain
(74) Attorney, Agent, or Firm—Oblon, Spivak, McClelland, Maier & Neustadt, P.C.

(57) ABSTRACT

A pigment-comprising formulation for coating substrates, comprising:

(i) an aqueous dispersion of at least one water-insoluble polymer P which has phosphonate groups, as a binder, said polymer P having a glass transition temperature Tg in the range of –60° to 80° C., (ii) at least one inorganic pigment, (iii) optionally, one or more inorganic fillers, and (iv) at least one auxiliary, wherein water-insoluble polymer P is obtained by free-radical aqueous emulsion polymerization of ethylenically unsaturated monomers comprising:

90 to 99.9% by weight of at least one monomer a, which is selected from the group consisting of vinylaromatic monomers, the esters of acrylic acid with $C_1$–$C_{12}$-alkanols, the vinyl esters of aliphatic $C_1$–$C_{12}$-monocarboxylic acids, ethylene and vinylchloride, and 0.1 to 10% by weight of at least one phosphonate group containing monomer.

10 Claims, No Drawings

PIGMENTED FORMULATIONS BASED ON AQUEOUS POLYMER DISPERSIONS

The present invention relates to pigment-comprising formulations which comprise as binder at least one aqueous polymer dispersion whose polymer is functionalized with phosphonate groups.

Pigmented formulations are employed widely in the form of emulsion paints, synthetic-resin-bound plasters (dispersion plasters), sealing compounds or filling compositions for purposes of architectural protection or for decorative purposes. Pigmented formulations generally include as binder a film-forming polymer, at least one inorganic pigment with or without one or more inorganic fillers, and also customary auxiliaries. The quality of the coatings formed from pigmented formulations depends critically on the ability of the film-forming polymer to bind, equally, the nonfilm-forming constituents, the pigments and inorganic fillers.

A low pigment-binding capacity leads to poor mechanical stability of the coating, which is manifested, for example, in a low wet abrasion resistance. The desire, however, is for high wet abrasion resistance, especially in the case of washable emulsion The pigment-binding capacity of the binder plays a particularly important part in formulations having a high content of inorganic pigments and fillers which is generally reflected in a pigment volume concentration (p.v.c.) of >40%. The p.v.c. is usually defined as the percentage quotient of the overall volume of the solid inorganic constituents (pigment+fillers) divided by the overall volume of the solid inorganic constituents and of the polymer particles of the aqueous binder polymer dispersion; see Ullmanns Enzyklopädie der technischen Chemie, 4th Edition, Volume 15, p. 668.

In the case of exterior applications in particular, the coating compositions should be stable to environmental influences such as sunlight, moisture and fluctuations in temperature. In addition, the coating composition must adhere well to a variety of substrates, which again depends on the chosen binder polymer.

Another property dependent on the binder polymer is the blocking resistance of the coatings.

EP-A-184 091 describes coating compositions based on aqueous polymer dispersions which have a low film-forming temperature and form films of high blocking resistance. The polymer dispersions disclosed therein may also comprise, in copolymerized form, monomers having a crosslinking action. The coating materials described include only small amounts of inorganic substances and pigments.

EP-A-327 006 and EP-A-327 376 describe aqueous polymer dispersions comprising siloxane-functional monomers in copolymerized form. Such monomers, however, are expensive, with even a small amount pushing up the binder preparation costs sharply. It must also be reckoned that hydrolysis of the siloxane groups will alter the properties of the binder in the course of storage.

U.S. Pat. No. 4,219,454 describes binders for coating materials which are based on aqueous polymer dispersions comprising, in copolymerized form, urea-functional monomers for improving the adhesion of the coatings in the moist state. The coatings described therein, however, have only low pigment contents. The problem of the wet abrasion resistance of coating materials is not adequately solved by the polymers described therein.

GB 1,189,560 discloses latex paints (=emulsion paints) to which low molecular mass alkyl phosphates or alkyl phosphonates are added to improve the dispersion of the inorganic pigments.

EP-A-625 541 and WO 93/11181 disclose titanium dioxide-containing formulations comprising as binder aqueous polymer dispersions whose polymers have phosphate groups. The phosphate groups improve the adsorption of the latex particles on the surface of the pigment particles. The storage life of the formulations disclosed therein, however, leaves much to be desired, since their viscosity increases over the course of time.

U.S. Pat. No. 4,110,285 proposes polymers containing phosphate groups as binders for high-gloss emulsion paints. Here too, the problem of storage life arises.

The prior art binders are able to go only some of the way toward meeting the requirements that are placed on coating materials.

It is an object of the present invention to provide pigmented formulations possessing a high pigment-binding capacity, and hence a high wet abrasion resistance, good wet adhesion to a very wide variety of substrates, and good blocking resistance. These properties must also be retained at relatively high pigment volume concentrations, ie. p.v.c. >40%. In addition, the formulations are required to be stable on storage; in other words, their viscosity should show little or no increase even on prolonged storage.

We have found that this object is achieved by using, for the formulations, binders based on aqueous dispersions whose polymers have been modified with phosphonate groups.

The present invention accordingly provides formulations for coating substrates, comprising i) at least one polymer P which has phosphonate groups, as binder,
ii) at least one inorganic pigment,
iii) if desired, one or more inorganic fillers, and
iv) customary auxiliaries.

The phosphonate-functional polymers P to be used in the formulations of the invention are in principle obtainable in a variety of ways. For instance, the phosphonate groups can be generated in a conventional polymer by means of polymer-analogous reaction. The sole prerequisite for this is that the polymer has reactive functional groups that are amenable to a polymer-analogous reaction. One possible procedure, for example, is to react a reactive functional group of the polymer in a polymer-analogous reaction with a phosphonate-functional compound which in turn possesses a reactive functional group that is complementary to the reactive group on the polymer. An example is the reaction of polymers having glycidyl groups with compounds that contain phosphonate groups and additionally have amino groups, and vice versa. The reaction of phosphonate groups can take place, for example, in the manner of a Moedritzer reaction (Moedritzer et al., J. Org. Chem. 31 (1966) 1603) by reacting amino-containing polymers with phosphorous acid in the presence of formaldehyde.

The preparation of phosphonate-functional polymers P, and the preparation of appropriate prepolymers, which are converted only subsequently by polymer-analogous reaction into the phosphonate-functional polymers P, can in principle take place by all known polymerization techniques for ethylenically unsaturated monomers, such as bulk, solution, precipitation, suspension or emulsion polymerization. Preparation takes place preferably by means of emulsion polymerization. This is particularly appropriate when the phosphonate groups are introduced by copolymerizing appropriate phosphonate-functional monomers into the polymer P.

In general, the polymers P are used in the form of aqueous dispersions in the pigmented formulations of the invention. It is not least for this reason that free-radical aqueous emulsion polymerization is advisable for preparing the polymers P. Polymers P obtainable in another way can be converted to aqueous dispersions by means of suitable measures that are known from the prior art (and are then known as secondary dispersions).

Preferably, the aqueous polymer dispersions employed in the formulations of the invention are obtainable by free-radical aqueous emulsion polymerization of ethylenically unsaturated monomers, in which at least one monomer a and at least one different monomer b of the formula I

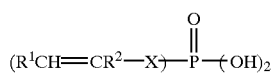 (I)

where $R^1$ is hydrogen, $C_1$–$C_4$-alkyl, COOH, —$CO_2$-Alk-OH or —$CO_2$-Alk-P(O)(OH)$_2$ and $R^2$ is hydrogen, alkyl, —$CH_2$—$CO_2$H, —$CH_2$—$CO_2$-Alk-OH or $CH_2$—$CO_2$-Alk-P(O)(OH)$_2$, in which Alk is $C_1$–$C_4$-alkylene, X is a single bond, alkylene, arylene, —$R^3$—Z—O—$R^4$— or —$R^3$—Z—NH—$R^4$—, in which $R^3$ is attached to a carbon of the double bond and is a single bond, alkylene or arylene, $R^4$ is alkylene or arylene and Z is CO or $SO_2$ or a salt thereof are reacted with one another.

In the text below alkyl is preferably linear or branched $C_1$–$C_{12}$-alkyl, especially $C_1$–$C_8$-alkyl, such as methyl, ethyl, n-propyl, i-propyl, 1-butyl, 2-butyl, i-butyl, t-butyl, 1-pentyl, 2-pentyl, 3-pentyl, 1-hexyl or 2-ethylhexyl. Cycloalkyl is preferably cyclopentyl or cyclohexyl. Aryl is preferably phenyl or naphthyl unsubstituted or substituted by 1 to 4 substituents selected independently from $C_1$–$C_4$-alkyl, especially methyl or ethyl, $C_1$–$C_4$-alkoxy, such as methoxy or ethoxy, hydroxyl, which can also if desired be ethoxylated, and halogen. Alkylene is a divalent alkyl, preferably a $C_1$–$C_{12}$-alkyl, such as methylene, 1,1- or 1,2-ethylene, 1,1-, 1,2-, 1,3- or 2,2-propylene, 1,4-butylene, 2-methyl-1,2-propylene, 1,6-hexylene and 1,8-octylene. Arylene is a divalent aryl, preferably 1,2- or 1,4-phenylene. Aralkyl is an aryl attached to the respective center via an alkylene. Oxyalkylene is an alkylene attached to the polymer via an oxygen, and hence polyoxyalkylene denotes alkylene units each attached to one another by way of oxygens.

In the formula I $R^1$ is preferably hydrogen. $R^2$ is preferably hydrogen or methyl. X is preferably a single bond, $C_1$–$C_4$-alkylene, especially methylene, or is arylene, especially 1,2-, 1,3- or 1,4-phenylene. Alternatively, X is preferably a group —$R^3$—Z—NH—$R^4$— where $R^3$ is a single bond and Z is a carbonyl function. $R^4$ in this case is preferably $C_1$–$C_4$-alkylene, especially 1,2-ethylene and 2-methyl-1,2-propylene. Examples of suitable phosphonate-functional monomers of the formula I include vinylphosphonic acid, allylphosphonic acid, α-phosphonostyrene, 2-acrylamido-2-methylpropanephosphonic acid, 2-methacrylamido-2-methylpropanephosphonic acid and salts thereof, examples being their alkali metal salts.

Particularly preferred monomers b are vinyl phosphonate and allyl phosphonate, and their salts, especially their sodium salts. The phosphonate-functional monomers b make up preferably from 0.1 to 10% by weight, in particular from 0.2 to 5% by weight and, with particular preference, from 0.5 to 3% by weight of the total monomer amount.

Suitable monomers a are selected from vinylaromatic monomers such as styrene, α-methylstyrene, ortho-chlorostyrene or vinyltoluenes, vinyl esters of $C_1$–$C_{18}$ and preferably $C_1$–$C_{12}$ monocarboxylic acids, such as vinyl acetate, vinyl propionate, vinyl butyrate, vinyl valerate, vinyl hexanoate, vinyl 2-ethylhexanoate, vinyl decanoate, vinyl laurate, vinyl stearate and vinyl Versatate® (vinyl esters of branched, aliphatic carboxylic acids having 6 to 11 carbons, which are in commerce as Versatic® X acids from Shell). Also suitable are esters of α,β-ethylenically unsaturated $C_3$–$C_8$ mono- or C4–$C_8$ dicarboxylic acids, preferably with $C_1$–$C_{12}$- and, in particular, $C_1$–$C_8$-alkanols or $C_5$–$C_8$-cycloalkanols. Examples of suitable $C_1$–$C_{12}$-alkanols are methanol, ethanol, n-propanol, i-propanol, 1-butanol, 2-butanol, isobutanol, tert-butanol, n-hexanol and 2-ethylhexanol. Examples of suitable cycloalkanols are cyclopentanol or cyclohexanol. Particularly suitable are esters of acrylic acid, of methacrylic acid, of crotonic acid, of maleic acid, of itaconic acid, of citraconic acid or of fumaric acid. Specifically these are methyl, ethyl, n-butyl, isobutyl, 1-hexyl and 2-ethylhexyl (meth)acrylate, dimethyl maleate or di-n-butyl maleate. Also suitable are nitriles of α,β-monoethylenically unsaturated $C_3$–$C_8$ carboxylic acids, such as acrylonitrile or methacrylonitrile. It is also possible to employ $C_4$–$C_8$ conjugated dienes, such as 1,3-butadiene, isoprene or chloroprene, as monomers a. Said monomers make up preferably from 80 to 99.9% by weight, in particular from 90 to 99.9% by weight and, especially, from 95 to 99.7% by weight, based on the overall weight of the monomers employed. The monomers a preferably include at least two different monomers a1 and a2. Preferred monomers a1 and a2 are the $C_1$–$C_{12}$-alkyl esters of acrylic acid and of methacrylic acid, vinylaromatic monomers, especially styrene and α-methylstyrene, and the vinyl esters of aliphatic $C_1$–$C_{12}$ carboxylic acids, preferably vinyl acetate and vinyl propionate, which are employed alone or in combination with vinyl chloride and/or ethylene, with vinyl Versatates or with $C_1$–$C_8$-alkyl acrylates as monomers a.

The binder polymers P preferably also comprise monomers c in copolymerized form, which enhance the wet adhesion of the formulations of the invention. Such monomers include ethylenically unsaturated compounds having urea groups (monomers c) examples being N-vinyl- and N-allylurea and derivatives of imidazolidin-2-one, such as N-vinyl- and N-allylimidazolidin-2-one, N-vinyloxyethylimidazolidin-2-one, N-(2-(meth)acrylamidoethyl)imidazolidin-2-one, N-(2-(meth)acryloxyethyl)imidazolidin-2-one, N-[2-((meth)acryloxyacetamido)ethyl]imidazolidin-2-one, etc. The monomers c are preferably used in amounts of from 0.1 to 10% by weight, in particular from 0.5 to 5% by weight, based on the total monomer amount.

The polymer P may also include monomers d in copolymerized form, the homopolymers of which are of increased solubility or swellability in water. These monomers are preferably copolymerized in amounts of <5% by weight, and preferably <2% by weight, based on the total monomer amount. Such monomers raise the stability of the polymer dispersions. They include monomers containing acidic groups (monomers d1), such as α,β-monoethylenically unsaturated mono- and dicarboxylic acids of 3 to 10 carbons, and also ethylenically unsaturated sulfonic acids, and the water-soluble salts thereof. Examples of monomers d1 having acidic groups are the above-mentioned ethylenically unsaturated carboxylic or dicarboxylic acids, especially acrylic and methacrylic acid, and also vinyl- and allylsulfonic acid, (meth)acrylamidoethanesulfonic acid, methacrylamido-2-methyl-propanesulfonic acid and the alkali metal salts of the sulfonic acids, especially their sodium salts. It should be noted here, however, that a high content of acid groups in the binder polymer reduces the water resistance of coatings. Other than the phosphonate-functional monomers b of the invention the polymer P preferably contains no other monomers which possess an acidic group. The monomers d also embrace neutral or nonionic, modifying monomers d2, examples being the amides, N-alkylolamides or hydroxyalkyl esters of the above-mentioned carboxylic acids, such as acrylamide, methacrylamide, N-methylolacrylamide, N-methylolmethacrylamide, 2-hydroxyethylacrylamide, 2-hydroxyethylmethacrylamide, hydroxyethyl acrylate, hydroxyethyl methacrylate, hydroxypropyl acrylate and hydroxypropyl methacrylate.

Furthermore, bifunctional monomers e can be employed in preparing the polymer P. Where desired these monomers e are copolymerized in a minor amount, generally from 0.1 to 5% by weight and in particular up to 1% by weight, based on the total monomer amount. They preferably comprise monomers having two nonconjugated, ethylenically unsaturated bonds, examples being the diesters of dihydric alcohols with α,β-monoethylenically unsaturated $C_3$–$C_8$ carboxylic acids, such as glycol bisacrylate, or esters of α,β-unsaturated carboxylic acids with alkenols, such as bicyclodecenyl (meth)acrylate. Preferred polymers P contain no copolymerized monomers e.

The binder polymers can of course also include monomers which are known to improve the pigment-binding power. Examples of these include siloxane-functional monomers, such as the vinyltrialkoxysilanes, vinyltrimethoxysilane for example, the alkylvinyldialkoxysilanes or the (meth)acryloxyalkyltrialkoxysilanes, such as (meth) acryloxyethyltrimethoxysilane or (meth) acryloxypropyltrimethoxysilane. These monomers can be used in amounts of up to 1% by weight, preferably from 0.05 to 0.5% by weight, based on the total monomer amount.

The character of the formulations of the invention is also dependent on the glass transition temperature (DSC, midpoint temperature, ASTM D 3418-82) of the binder polymer P. If $T_g$ is too low, the coating is not very strong and tears when subjected to a mechanical load. If it is too high, the polymer no longer forms a film and the coating thus exhibits a reduced wet abrasion resistance. The glass transition temperature $T_g$ of the binder polymers P in question is therefore generally below 80° C., preferably below 60° C. and, with particular preference, below 400° C. In general, however, it is above −60° C., preferably above −10° C. and, in particular, above 0° C. In this context it proves useful to estimate the glass transition temperature of the dispersed polymer. According to Fox (T. G. Fox, Bull. Am. Phys. Soc. (Ser. II) 1 [1956] 123 and Ullmanns Enzyklopädie der technischen Chemie, Weinheim (1980) p. 17, 18) the glass transition temperature of copolymers at high molar masses is given in good approximation by $$\frac{1}{T_g} = \frac{X^1}{T_g^1} + \frac{X^2}{T_g^2} + \cdots \frac{X^n}{T_g^n}$$

where $X^1, X^2, \ldots, X^n$ are the mass fractions of the monomers $1, 2, \ldots, n$ and $T_g^1, T_g^2, \ldots, T_g^n$ are the glass transition temperatures of the homopolymers of $1, 2, \ldots, n$, in kelvins. These temperatures are known, for example from Ullmann's Encyclopedia of Industrial Chemistry, VCH, Weinheim, Vol. A 21 (1992) p. 169 or from J. Brandrup, E. H. Immergut, Polymer Handbook $3^{rd}$ ed., J. Wiley, New York 1989.

From what has been said above it is clear that the glass transition temperature of a polymer can be adjusted both by choosing an appropriate principal monomer a having a glass transition temperature within the desired range and by combining at least one monomer a1 with a high glass transition temperature and at least one monomer a2 with a low glass transition temperature, the latter procedure being preferred.

In a preferred embodiment of the present invention the monomers a making up the polymer P include at least one monomer a1 whose homopolymer for the limiting case of a very high (infinite) molecular mass, has a glass transition temperature $T_g$ of >30° C., and at least one monomer a2 whose homopolymer has a glass transition temperature $T_g$ of <20° C. Monomers a1 suitable for this purpose are, for example, styrene, α-methylstyrene, methyl methacrylate, ethyl methacrylate, n- and isopropyl methacrylate, n-, iso- and tert-butyl methacrylate, tert-butyl acrylate and vinyl acetate, and also acrylonitrile and methacrylonitrile, the two nitriles preferably making up not more than 30% by weight of the monomers a1. Examples of suitable monomers a2 for this purpose are the $C_1$–$C_{12}$-alkyl acrylates, butadiene, vinyl Versatates, and especially ethyl acrylate, n-butyl acrylate and 2-ethylhexyl acrylate. Particular preference is given to monomer combinations a1/a2 which comprise styrene and/or methyl methacrylate and also n-butyl acrylate with or without 2-ethylhexyl acrylate.

In a particularly preferred embodiment of the present invention the binder polymer P is composed of:
i) from 20 to 80% by weight, preferably from 35 to 70% by weight, of monomers a1, especially styrene and/or methyl methacrylate,
ii) from 20 to 80% by weight, preferably from 30 to 65% by weight, of monomers a2, especially n-butyl acrylate and/or ethylhexyl acrylate,
iii) from 0.2 to 5% by weight, preferably from 0.5 to 3% by weight, of at least one monomer b, especially vinyl phosphonate, allyl phosphonate and/or 2-methacrylamido-2-methylpropanephosphonic acid or the sodium salts thereof,
iv) from 0.5 to 5% by weight, preferably from 1 to 3% by weight, of monomers c having at least one urea group, especially an ethylenically unsaturated derivative of imidazolidin-2-one, the proportions by weight of monomers a1, a2, b and c adding up to 100% by weight.

It has additionally proven advantageous if the polymer particles in the binder polymer dispersion have a ponderal median polymer particle diameter in the range from 50 to 1000 nm (determined by means of an ultracentrifuge or by photon correlation spectroscopy; regarding the determination of particle size by ultracentrifuge see, for example, W. Mächtle, Makromolekulare Chemie 185 (1984) 1025–1039 and Angew. Makromolekulare Chemie 162 (1988) 35–42). In the case of binder dispersions having high solids contents, such as >50% by weight, based on the overall weight of the binder dispersion, it is advantageous on grounds of viscosity for the ponderal median particle diameter of the polymer particles of the dispersion to be ≧250 nm. The median particle diameter will generally not exceed 1000 nm and preferably will not exceed 600 nm.

The aqueous polymer dispersions employed in accordance with the invention are preferably prepared by free-radical aqueous emulsion polymerization of the above-mentioned monomers in the presence of at least one free-radical polymerization initiator, with or without a surface-active substance.

Suitable free-radical polymerization initiators are all those capable of triggering a free-radical aqueous emulsion polymerization. They can be peroxides, for example alkali metal peroxodisulfates, or azo compounds. As polymerization initiators it is common to use redox initiators, which are composed of at least one organic reducing agent and at least one peroxide and/or hydroperoxide, examples being tert-butyl hydroperoxide with sulfur compounds, such as the sodium salt of hydroxymethanesulfinic acid, sodium sulfite, sodium disulfite, sodium thiosulfate or acetone bisulfate, or hydrogen peroxide with ascorbic acid. Use is also made of combined systems which comprise a small amount of a metal compound which is soluble in the polymerization medium and whose metal component can exist in a plurality of valence states, an example of such a system being ascorbic acid/iron (II)sulfate/hydrogen peroxide, where the ascorbic acid is frequently replaced by the sodium salt of hydroxymethanesulfinic acid, acetone bisulfite, sodium sulfite, sodium hydrogen sulfite or sodium bisulfite and the hydrogen peroxide by organic peroxides, such as tert-butyl hydroperoxide, or by alkali metal peroxodisulfates and/or ammonium peroxodisulfate. Initiators which are likewise preferred are peroxodisulfates, such as sodium peroxodisulfate. The amount of the free-radical initiator systems that are employed, based on the overall amount of the monomers to be polymerized, is preferably from 0.1 to 2% by weight.

Surface-active substances suitable for conducting the emulsion polymerization are the emulsifiers and protective colloids commonly employed for this purpose. The surface-active substances are normally employed in amounts of up to 10% by weight, preferably from 0.5 to 5% by weight, and in particular, from 1 to 4% by weight, based on the monomers to be polymerized.

Examples of suitable protective colloids are polyvinyl alcohols, starch and cellulose derivatives, or vinylpyrrolidone copolymers. An exhaustive description of further suitable protective colloids is given in Houben-weyl, Methoden der organischen Chemie, Volume XIV/1, makromolekulare Stoffe (Macromolecular substances), Georg-Thieme-Verlag, Stuttgart 1961, pp. 411–420. Mixtures of emulsifiers and/or protective colloids can also be used. As surface-active substances it is preferred to employ exclusively emulsifiers, whose relative molecular weights, unlike those of the protective colloids, are usually below 2000. They can be anionic, cationic or else nonionic in nature. The anionic emulsifiers include alkali metal and ammionium salts of alkyl sulfates (alkyl: $C_8$–$C_{12}$), of sulfuric monoesters of ethoxylated alkanols (EO units: 2 to 50, alkyl: $C_{12}$ to $C_{18}$) and of ethoxylated alkylphenols (EO units: 3 to 50, alkyl: $C_4$–$C_9$), of alkylsulfonic acids (alkyl: $C_{12}$–$C_{18}$) and of alkylarylsulfonic acids (alkyl: $C_9$ to $C_{18}$). Further suitable emulsifiers are given in Houben-Weyl, loc. cit., pp 192–208).

The anionic surface-active substances also include compounds of the formula II

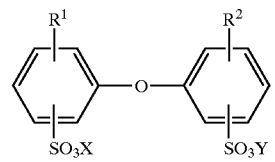

(II)

where $R_1$ and $R^2$ are hydrogen or $C_4$–$C_{24}$-alkyl but are not both hydrogen, and X and Y can be alkali metal and/or ammonium ions. In the formula II $R^1$ and $R^2$ are preferably linear or branched $C_6$–$C_{18}$-alkyls or hydrogen, and in particular have 6, 12 or 16 carbons but are not both hydrogen. X and Y are preferably sodium, potassium or ammonium, with sodium being particularly preferred. Particularly advantageous compounds II are those in which X and Y are sodium, $R^1$ is a branched alkyl of 12 carbons and $R^2$ is hydrogen or is the same as $R^1$. Use is frequently made of technical-grade mixtures which have a proportion of from 50 to 90% by weight of the monoalkylated product, an example being Dowfax® 2A1 (trademark of Dow Chemical Company). The compounds II are widely known, for example from U.S. Pat. No. 4,269,749, and are obtainable commercially.

In addition to these anionic emulsifiers it is also possible to use nonionic emulsifiers. Suitable nonionic emulsifiers are araliphatic or aliphatic nonionic emulsifiers, examples being ethoxylated mono-, di- and trialkylphenols (EO units: 3 to 50, alkyl: $C_4$–$C_9$), ethoxylates of long-chain alcohols (EO units: 3 to 50, alkyl: $C_8$–$C_{36}$), and also polyethylene oxide/polypropylene oxide block copolymers. Preference is given to ethoxylates of long-chain alkanols (alkyl: $C_{10}$–$C_{22}$, mean degree of ethoxylation: 3 to 50) and, of these, particular preference to those based on naturally occurring alcohols or oxoalcohols having a linear or branched $C_{12}$–$C_{18}$-alkyl radical and a degree of ethoxylation of from 8 to 50. It is preferred to use anionic emulsifiers, or combinations of at least one anionic and one nonionic emulsifier.

The molecular weight of the polymers can be adjusted by adding small amounts, generally up to 2% by weight based on the monomers to be polymerized, of one or more molecular weight regulators, examples being organic thio compounds, silanes, allyl alcohols or aldehydes.

The emulsion polymerization can be conducted either continuously or by the batch procedure, preferably by a semicontinuous procedure. In this case the monomers to be polymerized can be supplied continuously, including by a stepwise or gradient procedure, to the polymerization batch.

In addition to the seed-free preparation method it is also possible, in order to establish a defined polymer particle size, to conduct the emulsion polymerization by the seed latex process or in the presence of seed latex prepared in situ. Processes for this purpose are known and can be taken from the prior art (see EP-B 40419, EP-A-614 922, EP-A-567 812 and literature cited therein, and also 'Encyclopedia of Polymer Science and Technology', Vol. 5, John Wiley & Sons Inc., New York 1966, p. 847).

The polymerization is preferably conducted in the presence of from 0.01 to 3% by weight, and in particular from 0.05 to 1.5% by weight, of a seed latex (solids content of the seed latex, based on total monomer amount), preferably with a seed latex included in the initial charge (initial-charge seed). The latex generally has a weight-average particle size of from 10 to 100 nm and, in particular, from 20 to 50 nm. Its constituent monomers are, for example, styrene, methyl methacrylate, n-butyl acrylate and mixtures thereof, and to a minor extent it may also include monomers d, preferably less than 10% by weight based on the overall weight of the polymer particles in the seed latex, in copolymerized form.

The pressure and temperature of polymerization are of minor importance. It is normal to operate at between room temperature and 120° C., preferably at from 40 to 95° C. and, with particular preference, at from 50 to 90° C.

Following the actual polymerization reaction it is possible if desired to render the aqueous polymer dispersions of the invention substantially free from odoriferous substances, such as residual monomers and other volatile organic constituents. This can be done physically in a manner known per se, by distillative removal (especially by steam distillation) or by stripping with an inert gas. The residual monomer content can also be lowered chemically by means of free-radical postpolymerization, especially under the action of redox initiator systems, as are set out, for example, in DE-A 44 35 423, DE-A 44 19 518 and DE-A 44 35 422. The postpolymerization is preferably conducted with a redox initiator system comprising at least one organic peroxide and one organic sulfite.

By the method of emulsion polymerization it is possible in principle to obtain dispersions having solids contents of up to about 80% by weight (polymer content based on the overall weight of the dispersion). For practical reasons it is generally preferred to use polymer dispersions having solids contents in the range from 40 to 70% by weight for the formulations of the invention. Particular preference is given to dispersions having polymer contents of >50% by weight. Dispersions having lower solids contents are of course also suitable in principle for the formulations of the invention.

In accordance with the invention the phosphonate-functional polymers P are employed in the form of their aqueous polymer dispersions as binders in pigmented formulations that are used to coat substrates. Examples of what are meant by such formulations include polymer dispersion plasters, tile adhesives, paints and varnishes, or sealants (sealing compounds), especially for porous components.

A preferred embodiment of the present invention concerns formulations in the form of emulsion paints.

The formulations of the invention, preferably emulsion paints, generally contain from 30 to 75% by weight and, preferably, from 40 to 65% by weight of nonvolatile constituents. By these are meant all those constituents of the formulation except for water, but at least the total amount of binder, filler, pigment and solvents of low volatility, such as plasticizers, and polymeric auxiliaries. Of these, the amounts accounted for by each class of constituent are from 5 to 90% by weight, preferably from 10 to 60% by weight, by solid binder constituents (=polymer P), ii from 5 to 85% by weight, preferably from 10 to 60% by weight, by at least one inorganic pigment, iii from 0 to 85% by weight, preferably from 20 to 70% by weight, by inorganic fillers, and iv from 0.1 to 40% by weight, preferably from 0.5 to 15% by weight, by customary auxiliaries.

The p.v.c. of the formulations is generally above 10%, for example from 15 to 75%. In one preferred embodiment of the invention it is in the range from 15 to 25%. In another preferred embodiment of the invention the p.v.c. is in the range from >40% to 60% by weight, for example about 45% by weight. In another preferred embodiment of the invention the p.v.c. is >60%, preferably >70%, and can be up to 85%.

Typical pigments for the formulations of the invention, especially for emulsion paints, are, for example, titanium dioxide, preferably in the rutile form, barium sulfate, zinc oxide, zinc sulfide, basic lead carbonate, antimony trioxide, and lithopones (zinc sulfide +barium sulfate). However, the formulations may also comprise color pigments, such as iron oxides, carbon black, graphite, luminescent pigments, zinc yellow, zinc green, ultramarine, manganese black, antimony black, manganese violet, Paris blue or Schweinfurter green. In addition to the inorganic pigments the formulations of the invention may also include organic color pigments, examples being sepia, gamboge, Cassel brown, toluidine red, para red, Hansa yellow, indigo, azo dyes, anthraquinonoid and indigoid dyes, and also dioxazine, quinacridone, phthalocyanine, isoindolinone and metal complex pigments.

Suitable fillers include, basically, alumosilicates, such as feldspars, silicates, such as kaolin, talc, mica, magnezite, alkaline earth metal carbonates, such as calcium carbonate, in the form of calcite or chalk, for example, magnesium carbonate, dolomite, alkaline earth metal sulfates, such as calcium sulfate, silicon dioxide, etc. The fillers can be employed as individual components. In practice, however, filler mixtures have proven especially suitable, such as calcium carbonate/kaolin and calcium carbonate/talc. Dispersion plasters may also include relatively coarse aggregates, such as sands or sandstone granules. In emulsion paints, of course, finely divided fillers are preferred.

To increase the hiding power and to save on the use of white pigments it is common to employ finely divided extenders, such as finely divided calcium carbonate or mixtures of various calcium carbonates with different particle sizes, in the preferred emulsion paints. To adjust the hiding power, the shade and the depth of color it is preferred to employ blends of color pigments and extenders.

The customary auxiliaries iv include wetting agents or dispersions, such as sodium or potassium polyphosphates, alkali metal salts of polyacrylic acids, alkali metal salts of polymaleic acid, polyphosphonates, such as sodium 1-hydroxyethane-1,1-diphosphonate, and also naphthalene-sulfonic acid salts, especially their sodium salts. The dispersants or wetting agents are generally employed in an amount of from 0.1 to 0.6% by weight, based on the overall weight of the emulsion paint.

The auxiliaries iv may also include thickeners, examples being cellulose derivatives, such as methylcellulose, hydroxyethylcellulose and carboxymethylcellulose, and also casein, gum arabic, tragacanth gum, starch, sodium alginate, polyvinyl alcohol, polyvinylpyrrolidone, sodium polyacrylates, water-soluble copolymers based on acrylic and methacrylic acid, such as acrylic acid/acrylamide and methacrylic acid/acrylate copolymers, and associative thickeners, such as styrene-maleic anhydride polymers or, preferably, hydrophobically modified polyether urethanes, as are described, for example, by N. Chen et al. in J. Coatings Techn., Vol. 69, No. 867, 1997, p. 73 and by R. D. Hester et al., J. Coatings Technology, Vol. 69, No. 864, 1997, 109. The disclosure content of these documents is hereby incorporated in its entirety by reference.

Examples of hydrophobically modified polyether urethanes are polymers of the formula III

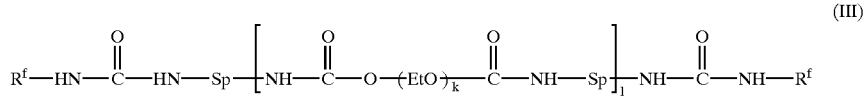

(III)

where $R^f$ is a hydrophobic radical, preferably a linear or branched alkyl of 10 to 20 carbons, Et is 1,2-ethylene, Sp is $C_2$–$C_{10}$-alkylene, cycloalkylene or arylene, k is from 50 to 1000 and l is from 1 to 10, the product k×l preferably being from 300 to 1000.

Inorganic thickeners, such as bentonites or hectorite, can also be used. Thickeners are generally used in amounts of from 0.1 to 3% by weight, preferably from 0.1 to 1% by weight, based on the overall weight of the aqueous formulation. In addition, the auxiliaries iv generally include defoamers, preservatives or hydrophobicizing agents, biocides, fibers or other constituents.

In addition, in order to establish the film-forming properties of the binder polymers, the coating materials may also comprise what are known as film-forming consolidating agents (plasticizers), examples being ethylene glycol, propylene glycol, butylene glycol, hexylene glycol, alkyl ethers and alkyl ether esters of glycols and polyglycols, for example diethylene glycol monoethyl ether, diethylene glycol monoethyl ether acetate, diethylene glycol monobutyl ether, hexylene glycol diacetate, propylene glycol monoethyl ether, propylene glycol monophenyl ether, monobutyl ether and monopropyl ether, dipropylene glycol monomethyl ether, dipropylene glycol mono-n-butyl ether, tripropylene glycol mono-n-butyl ether, and the acetates of the abovementioned monoalkyl ethers, for example butoxybutyl acetate, and also alkyl esters of aliphatic mono- and dicarboxylic acids, for example Texanol from Eastman, or technical-grade mixtures of dibutyl esters of succinic acid, glutaric acid and adipic acid, and also hydrocarbons and/or mixtures thereof, with or without aromatic constituents, such as white spirits in the boiling range of from 140 to 210° C. Film-forming auxiliaries are customarily employed in amounts of from 0.1 to 20% by weight, based on the polymer P present in the formulation, so that the formulation has a minimum film-forming temperature of <15° C. and preferably from 0 to 10° C.

Furthermore, the formulations employed in accordance with the invention may also include crosslinking additives. Additives of this kind can be: aromatic ketones, such as alkyl phenyl ketones unsubstituted or with one or more substituents on the phenyl ring, or benzophenone and substituted benzophenones, as photoinitiators. Photoinitiators suitable for this purpose are known, for example, from DE-A-38 27 975 and EP-A-417 568. Other suitable crosslinking compounds are water-soluble compounds having at least two amino groups, examples being dihydrazides of aliphatic dicarboxylic acids in accordance with DE-A-39 01 073, if the copolymer P comprises carbonyl-containing monomers in copolymerized form.

The formulations of the invention are stable fluid systems which can be used to coat a large number of substrates. Accordingly, the present invention also provides a method of coating substrates. Examples of suitable substrates are wood, concrete, metal, glass, ceramics, plastic, plaster, wallpaper and coated, primed or weathered substrates. The formulation is applied to the target substrate in a manner dependent on the form of the formulation. Depending on the viscosity and pigment content of the formulation and on the substrate application may take place by means of rolling, brushing, knife coating or spraying.

The coatings produced using the formulations of the invention are notable for high wet abrasion resistance and good adhesion in the wet state. The improved wet abrasion resistance—in other words, an improved mechanical stability of the coatings to abrasive influences in the wet state—is favorable for the weathering stability of the coatings and also provides them with washability. Moreover, the coatings are not tacky, and feature a high blocking resistance.

The advantageous properties of the polymer P as binder relative to prior art binder polymers, and especially its improved wet abrasion resistance, is equally in evidence in the case of pigmented formulations having a p.v.c. of <40% and with formulations having a p.v.c. of >40% or a p.v.c. of >60%. The advantages of the invention become particularly evident if the formulations have a p.v.c. of >40% and up to 85%, for example a p.v.c. of about 45% or a p.v.c. of from 70 to 80%. Accordingly, the present invention also provides for the use of the polymers P for improving the wet abrasion resistance of pigment-comprising formulations.

The examples below are intended to illustrate the invention without restricting it.

I. Preparing and Characterizing the Polymer Dispersions (Component A)

The average particle size (z-average) of the polymer particles was found by dynamic light scattering (photon correlation spectroscopy) on a 0.01% by weight dispersion in water at 23° C. using an Autosizer IIc from Malvern Instruments, England. The value stated is the cumulant z-average of the measured autocorrelation function.

The minimum film-forming temperature (MFT) of the polymer dispersions was determined in accordance with Ullmanns Enzyklopädie der technischen Chemie, 4th Ed. Vol. 19, VCH Weinheim 1980, p. 17. The measuring device used was a film formation bench (a metal plate to which a temperature gradient is applied and on which temperature sensors are mounted at different points for the purpose of temperature calibration, the temperature gradient being chosen so that one end of the film formation bench has a temperature above the anticipated MFT and the other end has a temperature below the anticipated MFT). The aqueous polymer dispersion is then applied to the film formation bench. In those regions of the bench whose temperature is above the MFT the dispersion dries to form a clear film, whereas in the cooler regions it forms a white powder. The MFT is determined visually on the basis of the known temperature profile of the plate.

Comparison Dispersion CD1

A reactor was charged with 234 g of deionized water, 38 g of aqueous sodium pyrophosphate solution (5% strength by weight) and 4.61 g of a polystyrene seed latex (particle size about 30 nm, solids content about 33% by weight). This initial charge was heated to 85° C. under nitrogen. Then 7.24 g of aqueous initiator solution were added. A monomer emulsion was then added over the course of 3 hours, and the remainder of the initiator solution over the course of 4 hours. After the end of the addition of initiator the temperature was maintained for 1 hour and then lowered to 60° C. Subsequently, 6.36 g of a 15% strength by weight aqueous solution of tert-butyl hydroperoxide and 7.25 g of an aqueous 13.1% strength by weight solution of acetone bisulfite were supplied to the reactor by way of separate feeds. The 60° C. were maintained for 1 hour. The batch was then cooled to room temperature and its pH adjusted to 7.4 using 10% strength by weight sodium hydroxide solution. The resulting dispersion was free from coagulum and had a solids content of 60.1% by weight. The weight-average particle diameter of the polymer was 270 nm. Its MFT was 6° C.

Initiator solution:
2.38 g of sodium peroxodisulfate
70.00 g of deionized water

Monomer emulsion:
227.73 g of deionized water
21.11 g of emulsifier solution 1
47.50 g of emulsifier solution 2
356.25 g of methyl methacrylate
502.55 g of n-butyl acrylate
19.00 g of methacrylic acid
72.20 g of a 25% strength by weight solution of N-(methacryloxy-ethyl)imidazolidin-2-one in methyl methacrylate Emulsifier solution 1: 45% strength by weight solution of sodium (dodecylsulfonyl-phenoxy)benzenesulfonate (Dowfax® 2A1 from Dow Chemicals) in water Emulsifier solution 2: 30% strength by weight solution of the sodium salt of a sulfuric monoester mixture of $C_{10}$–$C_{16}$-alkyl ethoxylates (mean degree of EO of 30) in water (Disponil® FES 77 from Henkel KGaA).

Dispersion D1

In the manner described for CD1, but with a different monomer composition, a dispersion D1, which is in accordance with the invention, was prepared. Following the polymerization reaction, the pH was adjusted to 7.3 using 10% strength by weight sodium hydroxide solution. The resulting dispersion was free from coagulum and had a solids content of 58.2% by weight. The average diameter of the polymer particles was 345 nm. The MFT was 5° C.

Monomer emulsion:
193.71 g of water
21.11 g of emulsifier solution 1
47.50 g of emulsifier solution 2
356.25 g of methyl methacrylate
502.55 g of n-butyl acrylate
10.22 g of vinylphosphonic acid
72.20 g of a 25% strength by weight solution of N-(methacryloxy-ethyl)imidazolidin-2-one in methyl methacrylate.

Dispersion D2

The dispersion D2 was prepared in the same way as for CD1. Following the polymerization reaction, the pH was adjusted to 9.1 using 10% strength by weight sodium hydroxide solution. The resulting dispersion was free from coagulum and had a solids content of 59.9% by weight. The average diameter of the polymer particles was 267 nm. The MFT was 5° C.

Monomer emulsion:
196.27 g of deionized water
21.11 g of emulsifier solution 1
47.50 g of emulsifier solution 2
356.25 g of methyl methacrylate
502.55 g of n-butyl acrylate
15.32 g of vinylphosphonic acid
72.20 g of a 25% strength by weight solution of N-(methacryloxy-ethyl)imidazolidin-2-one in methyl methacrylate.

II. Preparing the formulations of the invention
1. Emulsion paints with a p.v.c. of 46.9%; formulation(I) (Examples C1, 1 and 2)
A vessel was charged with the following constituents:
105.60 g of water
2.00 g of thickener[1]
0.80 g of 2-amino-2-methylpropanol with 5% water
1.00 g of dispersant[2]
3.40 g of 10% strength by weight aqueous tetrapotassium pyrophosphate solution
1.70 g of commercial biocide[3]
3.40 g of commercial defoamer[4]
10.10 g of propylene glycol
10.10 g of dipropylene glycol n-butyl ether
190.10 g of titanium dioxide pigment[5]
181.60 g of feldspar[6]
50.70 g of calcined kaolin[7]

The constituents were mixed for 20 minutes in a high-speed disperser. Then the following constituents were added with stirring:
266.01 g of polymer dispersion from I (60.1% by weight)
2.50 g of commercial defoamer[4]
11.80 g of commercial thickener[8]
159.00 g of water The performance properties of the emulsion paints are summarized in Table 1.

2. Emulsion paint with a p.v.c of 72% (formulation II) (Examples C2, 3 and 4)
253.00 g of water
1.00 g of 20% strength by weight aqueous KOH
6.00 g of commercial thickener[1]
3.00 g of dispersant[9]
3.00 g of 50% strength by weight aqueous tetrapotassium pyrophosphate solution
2.00 g of preservative[10]
2.00 g of defoamer[11]
95.00 g of titanium dioxide pigment[12]
215.00 g of calcium carbonate, 2 $\mu$m[13]
180.00 g of calcium carbonate, 5 $\mu$m[14]
65.00 g of talc/dolomite, 6 $\mu$m[15]
were mixed with one another in a high-speed disperser. The following were then added with stirring:
2.00 g of defoamer[11]
129.00 g of aqueous polymer dispersion from I (60.1% strength by weight)
17.00 g of water The performance properties of the emulsion paints are summarized in Table 2.

[1] hydroxyethylcellulose having a viscosity of 30 Pas (determined as a 2% strength solution in water at 25° C.); Natrosol® 250 HR from Hercules GmbH D üsseldorf.

[2] 30% strength by weight aqueous solution of an ammonium polyacrylate; pigmentverteiler [pigment dispersant] A from BASF AG, Ludwigshafen.

[3] Proxel®GXL from Zeneca GmbH, Frankfurt.

[4] Foammaster®S from Henkel KGaA, Düsseldorf

[5] Kronos®2101 from Kronos, Houston/Tex.

[6] Minex®4 from Unimin Speciality Minerals Inc. Elco/Ill., average particle size 7.5 $\mu$m

[7] Icecap® from Burgess Pigment Co., Sandersville, Ga.

[8] 20% strength by weight solution of a polyurethane associative thickener, Acrysol RM 202 from Rohm and Haas Deutschland GmbH, Frankfurt

[9] 45% strength by weight aqueous solution of a sodium polyacrylate; Pigmentverteiler S from BASF AG, Ludwigshafen.

10) Parmetol®A26 from Schulke & Mayr GmbH, Norderstedt.
11) Agitan 255 from Münzing-Chemie GmbH, Heilbronn
12) Kronos®2300 from Kronos Titan GmbH, Leverkusen
13) Calcite, average particle size 2 μm; Omyacarb 2GU from Omya GmbH, Cologne
14) Calcite, average particle size 5 μm; Omyacarb 5GU der Omya GmbH, Cologne
15) Talc/dolomite, average particle size 6 μm; Naiatsch SE-Micro from Luzenac Deutschland GmbH, Düsseldorf.

We claim:

1. A pigment-comprising formulation for coating substrates, comprising:
   (i) an aqueous dispersion of at least one water-insoluble polymer P which has phosphonate groups, as a binder, said polymer P having a glass transition temperature Tg in the range of −60° to 80° C.,
   (ii) at least one inorganic pigment,
   (iii) optionally, one or more inorganic fillers, and
   (iv) at least one auxiliary,
   wherein water-insoluble polymer P is obtained by free-radical aqueous emulsion polymerization of ethylenically unsaturated monomers comprising:
   90 to 99.9% by weight of at least one monomer a, which is selected from the group consisting of vinylaromatic monomers, the esters of acrylic acid with $C_1$–$C_{12}$-alkanols, the esters of methacrylic acid with $C_1$–$C_{12}$-alkanols, the vinyl esters of aliphatic $C_1$–$C_{12}$-monocarboxylic acids, ethylene and vinylchloride, and
   0.1 to 10% by weight of at least one different monomer b of the formula (I):

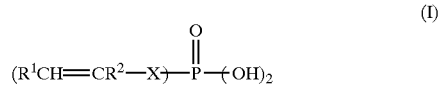

(I)

or a salt thereof, where
   $R^1$ is hydrogen, $C_1$–$C_4$-alkyl, COOH, —$CO_2$-alk-OH or —$CO_2$-alk-P(O)(OH)$_2$ and
   $R^2$ is hydrogen, $C_1$–$C_4$-alkyl, —$CH_2$—COOH, —$CH_2$—$CO_2$-alk-OH or —$CH_2$—$CO_2$-alk-P(O)(OH)$_2$, in which alk is $C_1$–$C_4$-alkylene,
   X is a single bond, alkylene, arylene, —$R^3$—Z—O—$R^4$— or —$R^3$—Z—NH—$R^4$—, in which $R^3$ is attached to the carbon of the double bond and is a single bond, alkylene or arylene,
   $R^4$ is alkylene or arylene, and
   Z is CO or $SO_2$.

2. A formulation as claimed in claim 1, where the monomer b is selected from the group consisting of vinylphosphonic acid, allylphosphonic acid, α-phosphonostyrene, 2-acrylamido-2-methylpropanephosphonic acid, 2-methacrylamido-2-methylpropanephosphonic acid, and salts thereof.

3. A formulation as claimed in claim 1, wherein the monomers to be polymerized comprise from 0.1 to 10% by weight of monomers c having urea groups.

4. A formulation as claimed in claim 1, wherein the monomers a comprise at least one monomer a1 whose homopolymer has a glass transition temperature of >30° C. and at least one monomer a2 whose homopolymer has a glass transition temperature of <20° C.

5. A formulation as claimed in claim 1, comprising, based on the solids content of the formulation:
   from 5 to 09% by weight of polymer P as set forth in claim 1,
   from 5 to 85% by weight of at least one inorganic pigment,
   from 0 to 85% by weight of inorganic fillers, and
   from 0.1 to 40% by weight of auxiliaries.

6. A formulation as claimed in claim 1, where the ratio of inorganic constituents to polymer P is reflected in a pigment volume concentration p.v.c. of >10%.

7. A method for improving the wet abrasion resistance of polymer-bound coating materials by using at least one polymer dispersion of a polymer P as set forth in claim 1 as a binder in said polymer-bound coating materials.

8. The method as claimed in claim 7, wherein said polymer-bound coating material is an emulsion paint.

9. The formulation as claimed in claim 6 which is an emulsion paint.

10. The formulation as claimed in claim 1, wherein the at least one auxiliary is a wetting agent or dispersion, a thickener, a film-forming consolidating agent, a defoamer, a preservative or hydrophobicizing agent, a biocide or a fiber.

* * * * *

UNITED STATES PATENT AND TRADEMARK OFFICE
CERTIFICATE OF CORRECTION

PATENT NO. : 6,492,451 B1  Page 1 of 1
DATED : December 10, 2002
INVENTOR(S) : Rolf Dersch et al.

It is certified that error appears in the above-identified patent and that said Letters Patent is hereby corrected as shown below:

<u>Column 16,</u>
Line 24, "from 5 to 09% by weight" should read -- from 5 to 90% by weight --.

Signed and Sealed this

Thirteenth Day of April, 2004

JON W. DUDAS
*Acting Director of the United States Patent and Trademark Office*